(12) United States Patent
Ford

(10) Patent No.: US 6,193,919 B1
(45) Date of Patent: Feb. 27, 2001

(54) METHOD AND APPARATUS FOR EXTRUDING SHAPED PRODUCTS FROM RECYCLED PLASTIC MATERIALS

(76) Inventor: Wayne H. Ford, Fibr-Plast Corporation 3225 S. Norwood, Suite 100, Tulsa, OK (US) 74135

(*) Notice: Subject to any disclaimer, the term of this patent is extended or adjusted under 35 U.S.C. 154(b) by 0 days.

(21) Appl. No.: 09/224,417

(22) Filed: Dec. 31, 1998

(51) Int. Cl.⁷ .................................................. B29C 47/90
(52) U.S. Cl. .................... 264/211.12; 425/377; 425/384; 425/385; 425/392; 425/325
(58) Field of Search .................................... 425/325, 377, 425/385, 392, 384; 264/209.4, 211.12

(56) References Cited

U.S. PATENT DOCUMENTS

| | | | |
|---|---|---|---|
| 3,776,679 | * | 12/1973 | Hegler . |
| 4,212,618 | * | 7/1980 | Hegler et al. . |
| 4,361,530 | * | 11/1982 | Peer . |
| 4,410,474 | * | 10/1983 | Ahrweiler . |
| 5,413,745 | | 5/1995 | Andersson ............................. 264/68 |
| 5,510,071 | * | 4/1996 | Van Wonderen et al. . |
| 5,786,000 | | 7/1998 | Berner ................................. 425/140 |
| 5,788,901 | | 8/1998 | Barnard et al. ....................... 264/165 |

FOREIGN PATENT DOCUMENTS 2119512    9/1995   (CA) .

* cited by examiner

Primary Examiner—Harold Pyon
Assistant Examiner—Joseph Leyson
(74) Attorney, Agent, or Firm—William S. Dorman

(57) ABSTRACT

In combination with a mixer/extruder of the type designed to mix, heat and extrude a mixture of shredded plastic material and shredded fibrous material, the heated mixture being extruded in the form of a continuous beam from an extrusion nozzle, the improvement which comprises a first matrix spaced horizontally downstream from the nozzle for receiving the beam therein and a second matrix spaced horizontally downstream from the first matrix for receiving the beam therein, the first matrix having a plurality of moveable walls which reciprocate in a horizontal direction against the outer surface of the beam, the second matrix having a plurality of moveable walls which reciprocate in a horizontal direction against the outer surface of the beam, the second matrix having means for conducting cooling water therethrough for cooling the beam as it passes through the second matrix.

6 Claims, 6 Drawing Sheets

METHOD AND APPARATUS FOR EXTRUDING SHAPED PRODUCTS FROM RECYCLED PLASTIC MATERIALS

BACKGROUND OF THE INVENTION

1. Field of the Invention

The invention relates to the field of producing shaped products from recycled plastic material, and more particularly to a method and apparatus for extruding shaped products from plastic material, particularly recycled materials including plastic.

2. The Prior Art

Plastic materials are sometime recycled by carefully sorting one type of refuse material from another, and ultimately producing granules of pure plastic of a particular type or grade. This is generally not an economical way to recycle plastics from household garbage since it is too costly to adequately separate and sort the different plastics and other materials which are present in household waste. Some uses are known for recycled impure waste plastics, sometimes mixed with other waste products. Typically this involves melting the plastics and pouring the melted plastics into molds to form products such as paving tiles or picnic tables. The process of pouring a mold and allowing the plastic to cure and cool, and then removing the product from the mold is a lengthy process which adds considerably to the cost of the end product and reduces its economic efficiency.

A method of continuously producing an elongated beam from recycled plastic material is disclosed in U.S. Pat. No. 5,413,745, issued to Curt Andersson, in which a mixture of inexpensive waste plastic and dried and heated waste fiber material such as paper is melted and compressed in a machine, and extruded in the form of a beam. The waste plastic material and the waste fiber material are preferably previously shredded or chopped up prior to feeding the same to the machine. In the Andersson process, a mixture of shredded plastic and filler material is fed by a screw feeder to a compression area where a screw conveyor of decreasing pitch further compresses the material, so that it is heated and melted. The molten mixture is continuously forced out of a square or rectangular nozzle in the form of a beam, after which moveable wall sections of a matrix are used to keep the beam shape of the material until it cools. According to Andersson, the beam of material coming out of the nozzle has a low mechanical strength, and the matrix is designed to work and cool the beam to improve its mechanical strength. The Andersson method is suitable for producing continuous elongated beams but the beams are still lacking the rigidity and strength required for structural purposes.

Canadian Patent No. 2,119,512, issued to Roman Evancic, provides a method and apparatus for producing shaped articles from recycled materials. The method comprises: producing a mixture of plastic and fibrous materials wherein the proportion of plastic to the fibrous materials is greater than approximately 10% and less than 60%; heating the mixture to a softened state adapted for extrusion; extruding the materials from an extrusion device through a shaping means to produce a sheet of softened extruded material; cooling and compressing the surface of the sheet to form a skin of relatively harder material on the surface of the extruded material; applying rollers having a low co-efficient of friction to the surface of the sheet under pressure to apply the desired shape to the surface of the sheet; and further cooling the sheet by the application of a cooling liquid.

Other patents of interest are U.S. Pat. No. 5,786,000, issued to Rolf Berner and U.S. Pat. No. 5,788,901, issued to Barnard et al.

SUMMARY OF THE INVENTION

The Andersson patent referred to above already recognizes that the beam of material coming out of the nozzle of the mixer/extruder has a low mechanical strength. To that end Andersson provides a single matrix having moveable walls adapted to contact the surface of the beam. However, the product produced by the Andersson method still has a low mechanical strength. Accordingly, the present invention provides two matrices which are separated from each other and which are positioned downstream of the nozzle of the mixer/extruder. In the present invention, the first matrix is four feet long, for example, and is provided with a plurality of moveable walls which contact and massage the outer surface of the beam as it passes from the nozzle through the first matrix. When the beam of material coming from the mixer/extruder is generally rectangular in cross section, subject to certain deviations in the upper and lower surfaces, the moveable walls can be four in number, and each wall is reciprocated by a separate piston/cylinder combination.

When the beam of material coming form the mixer/extruder is cylindrical in shape, the number of moveable walls can be three, for example, with each moveable wall subtending an arc of approximately 120 degrees; these walls will still be reciprocated by piston/cylinder combinations. In accordance with the present invention, the beam of material coming out of the first matrix referred to above, will pass through a second matrix which is located downstream of the first matrix and spaced therefrom. The second matrix, for example, need only be approximately two feet in length, it being understood that dimensions and shapes indicated herein are for purely illustrative purposes and not intended to be limiting. The second matrix is also provided with four moveable walls which reciprocate horizontally and whose combined inner surface corresponds with the shape of the beam of material passing therethrough. Each of the walls in the second matrix is designed to reciprocate horizontally by virtue of piston/cylinder combinations mounted on the second matrix. Preferably, the piston/cylinder combinations of the first matrix are coordinated with the piston/cylinder combinations of the second matrix such that the moveable walls of the first and second matrices are moved in concert.

Another feature of the present invention involves the use of cooling passageways in the moveable walls of the second matrix. Horizontal ports are provided in each of the moveable walls of the second matrix so that cooling water can flow into one passageway and out the other passageway to cool each of the walls of the second matrix. In this manner, the material passing through the second matrix will be cooled faster than the beam would otherwise be cooled by normal convection.

DETAILED DESCRIPTION OF THE PREFERRED EMBODIMENTS

Figure 1:
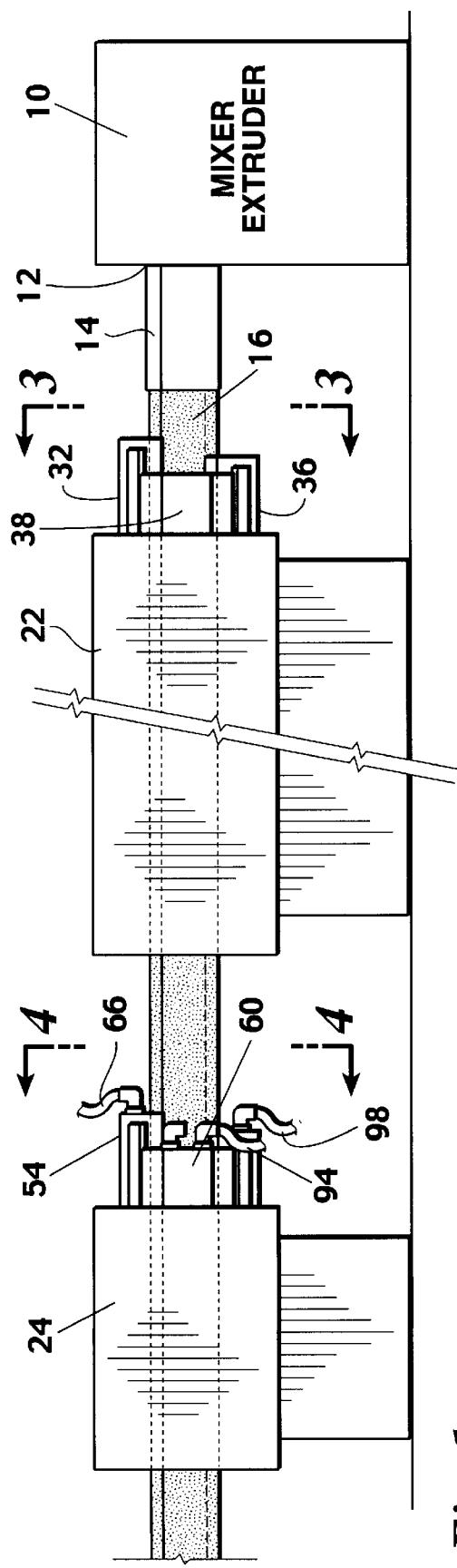
FIG. 1 is a semi-diagrammatic side elevation of the major components of the present invention in combination with a conventional mixer/extruder for use in producing a beam having a generally rectangular cross section.
Figure 2:
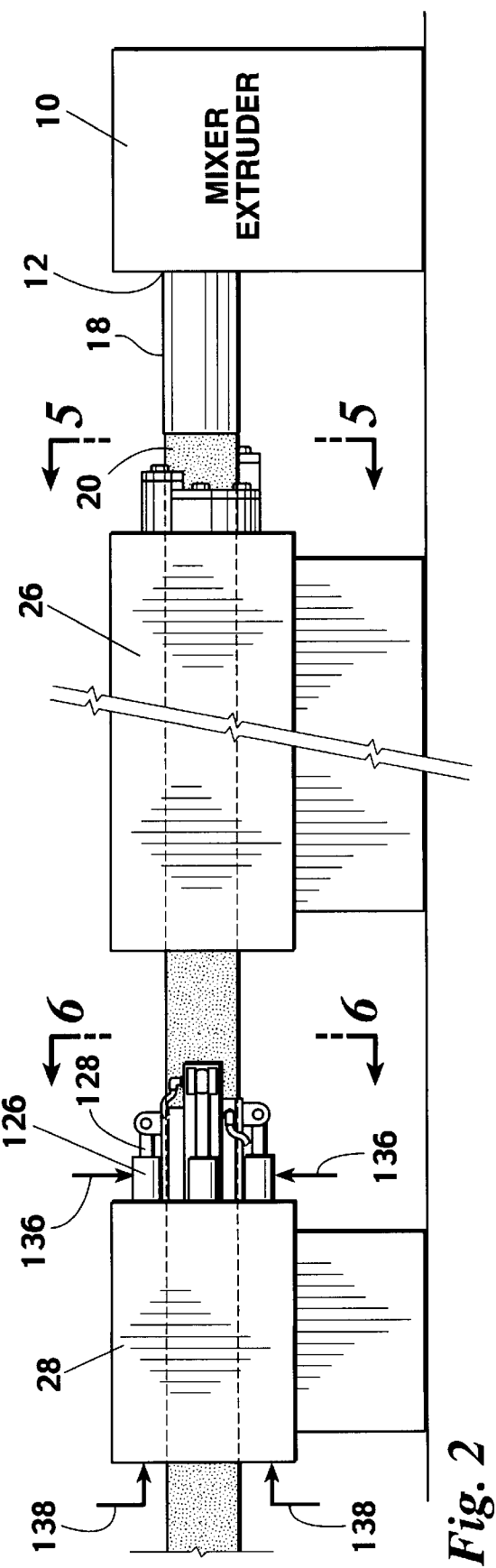
FIG. 2 is a view similar to FIG. 1, but showing the major components of the present invention in association with a mixer/extruder where the end product is of cylindrical shape.

Referring to the drawings in detail, FIG. 1 shows the major components of the present invention in association with a conventional mixer/extruder 10 essentially identical to that shown in FIG. 1 of Andersson U.S. Pat. No. 5,413,745 or FIG. 1 of Evancic Canadian Patent No. 2,119,512 dated Sep. 20, 1995. The operation of the mixer/extruder 10 is fully set forth in the disclosures of the aforementioned U.S. and Canadian Patents, the disclosures of which are incorporated herein by reference. Briefly, the mixer/extruder 10 will be provided with a nozzle (outlet)12 having an orifice shaped to correspond with the product to be produced. In the case of FIG. 2 the orifice 12 would have a round opening. In the case of FIG. 1 the orifice 12 would have a generally rectangular opening with a ridge at the top and a notch at the bottom.

In FIG. 1, an extruder tube 14 is placed over the orifice 12. The extruder tube 14 is approximately twelve inches in length as compared to the four inch high product 16 which comes out of the extruder tube 14. The extruder tube 14 is also hollow and shaped to correspond with the outlet shape of the orifice 12 in FIG. 1 and is approximately ⅜ inch thick.

In relation to FIG. 2, there is an extruder tube 18 which is about eighteen inches in length and which has a circular opening corresponding with the circular opening in the orifice 12. This arrangement provides a round beam 20 approximately four inches in diameter. The extruder tube 18 is hollow and approximately ⅜ of an inch in wall thickness as is the case with the extruder tube 14. The extruder tube 18, as indicated above, has a round cross section corresponding with the round opening in the nozzle 12 of FIG. 2.

Andersson U.S. Pat. No. 5,413,745 is provided with a single matrix shown in FIG. 2 thereof. On the other hand, FIG. 1 of the present invention provides two matrices 22 and 24. Everything to the left of the mixer/extruder 10 will be considered downstream. The matrix 22 is downstream of the mixer/extruder 10 and the matrix 24 is downstream of the matrix 22. The matrix 22 would be approximately four feet in length whereas the matrix 24 would be approximately two feet in length. There is approximately a four foot separation between the two matrices 22 and 24. The shapes of the openings provided through the matrices 22 and 24, as will be described hereinafter in further detail, is the same shape as that of the extruder tube 14; i.e. substantially rectangular with a V-shaped ridge at the top and a V-shaped notch at the bottom.

Turning now to FIG. 2, the arrangement shown here provides a matrix 26 downstream from the mixer/extruder 10 and a second matrix 28 downstream of the matrix 26. As in the case of FIG. 1, the matrix 26 is approximately four feet in horizontal length, the matrix 28 is approximately two feet in horizontal length and there is approximately a four foot horizontal separation between the two matrices. Again, the matrices 26 and 28 are internally shaped, as will be explained hereinafter, so that the beam 20 moving therethrough will move through a circular opening which conforms with the shape of the beam.

Figure 3:
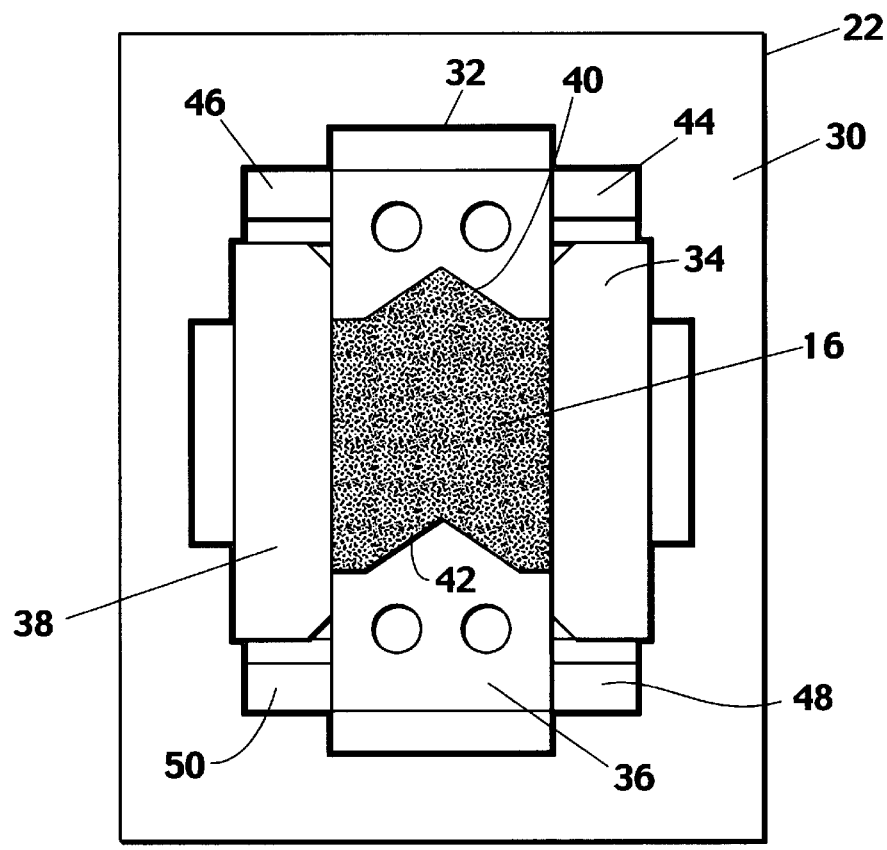
FIG. 3 is an end view looking along line 3—3 of FIG. 1.

Referring now to FIG. 3, the matrix 22 consists of an external support 30 and four slidable walls 32, 34, 36 and 38. The slidable wall 32 will be considered the upper wall and it is provided with a V-shaped notch 40 at the bottom thereof. The wall 36 will be considered as the bottom wall and it is provided with a V-shaped ridge 42 which together with the V-shaped notch on the upper slidable wall 32 engage the beam 16 along the upper and lower edges, respectively, to hold it in position while the beam is sliding through the matrix 22. The wall 34 is a vertical side wall which is also horizontally slidable and which engages one of the vertical side edges of the beam 16. The side wall 38 is the remaining wall which is also a vertical wall and which engages the opposite vertical side edge of the beam 16 as related to the vertical side wall 34.

Figure 7:
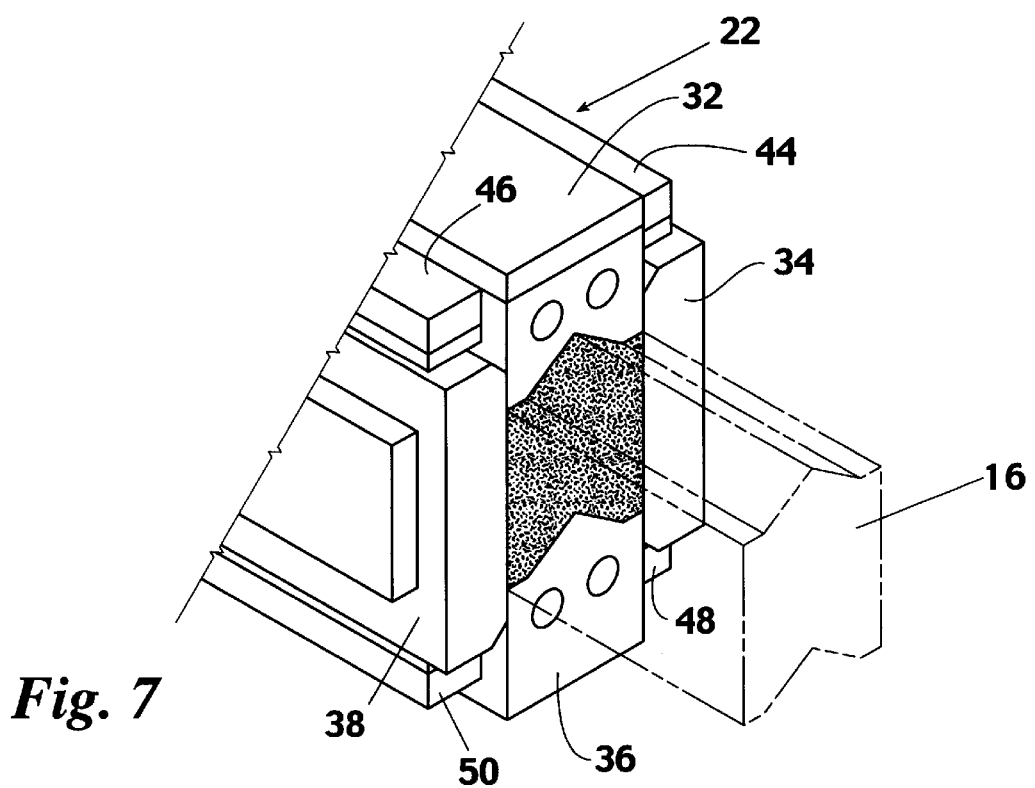
FIG. 7 is a perspective view of an end portion of one of the major components shown in FIG. 1 and showing the four moveable wall parts in horizontal alignment with each other.

As best shown in FIG. 7, the upper side wall 32 is in alignment with the lower side wall 36, whereas the side wall 34 is in alignment with the side wall 38 and all of the walls are in essentially vertical alignment at the forward end of the matrix 22.

Figure 8:
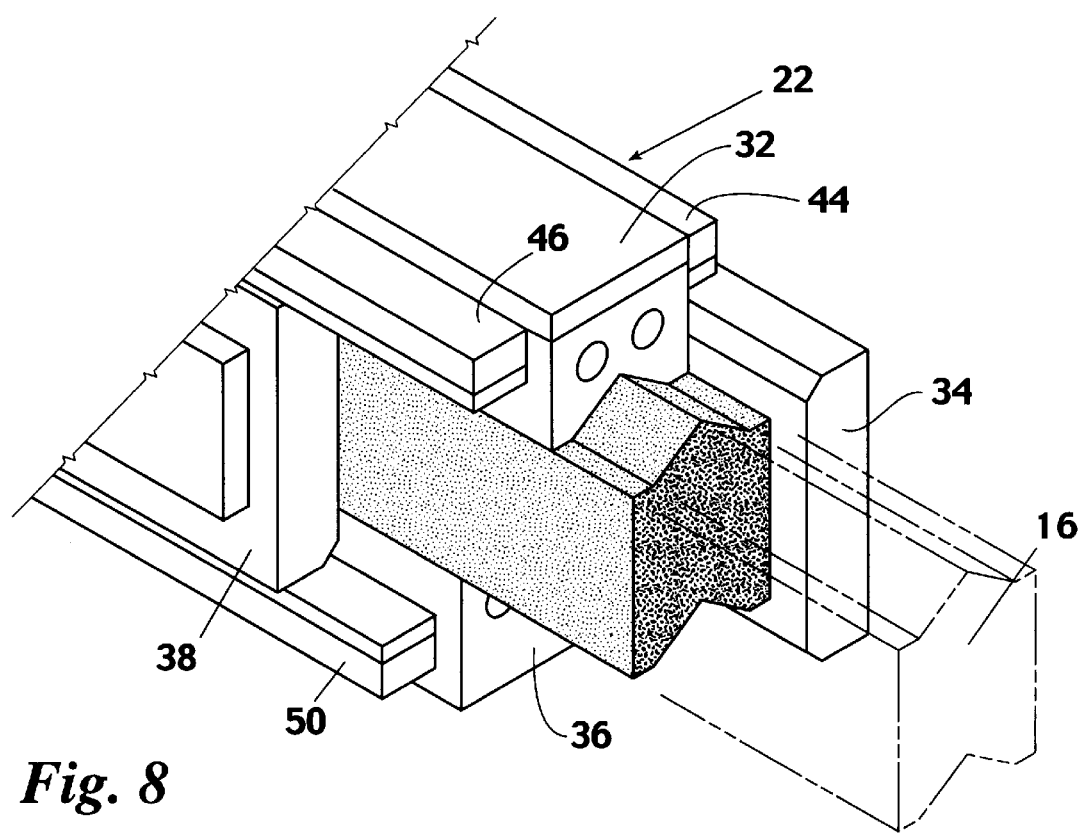
FIG. 8 is a perspective view somewhat similar to FIG. 7 but showing the top and rear wall members moved relatively toward the mixer/extruder as compared to the front and bottom wall members.

Turning now to FIG. 8, the moveable wall members of the matrix 22 have moved from the condition shown in FIG. 7. That is, the lower wall member 36 is now downstream with respect to the upper wall member 32 and the wall member 38 is relatively downstream with respect to the wall member 34.

Figure 9:
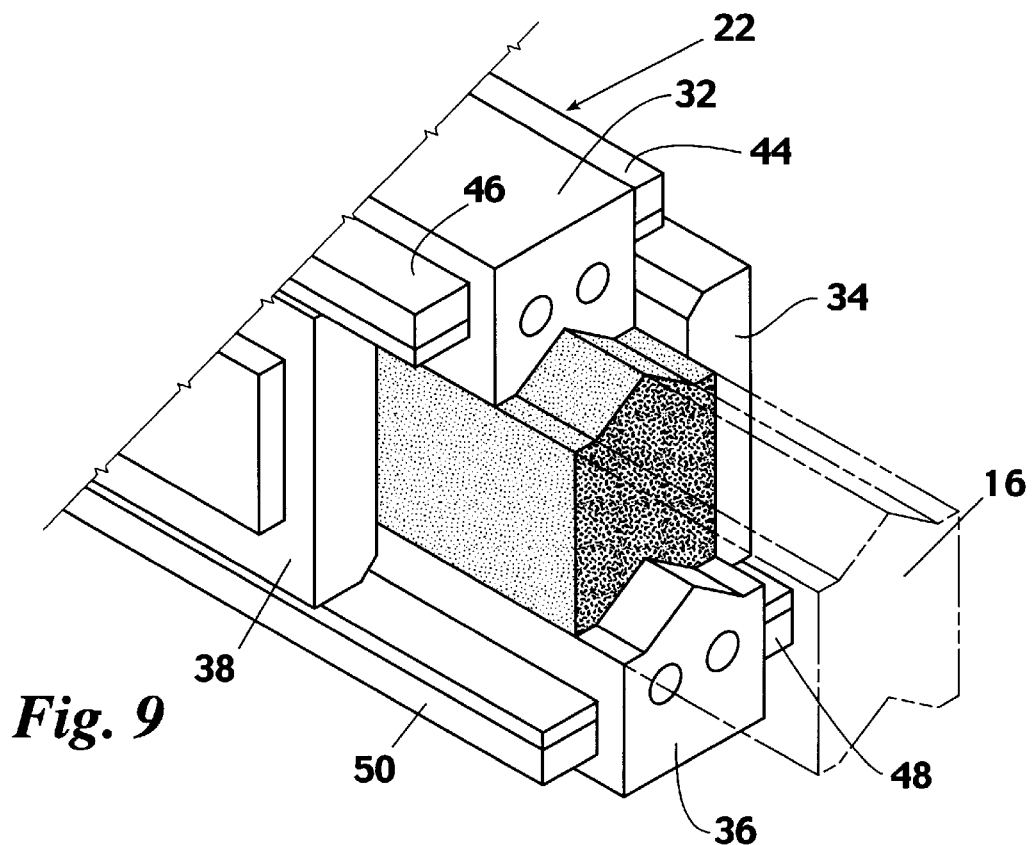
FIG. 9 is a view similar to FIG. 7 but showing the bottom and rear wall members moved relatively closer to the mixer/extruder than the front and bottom wall members.

As best shown in FIG. 9 the upper wall member 32 is provided with a pair of side extensions 44 and 46, whereas the lower wall 36 is provided with a pair of extensions 48 and 50. The extensions 46 and 50, for example, provide tracks along which the side wall 38 can slide. Likewise, the extensions 44 and 48 provide tracks along which the other side wall 34 can slide. The individual wall members 32, 34, 36, and 38 are horizontally slidable by virtue of four pistons and four cooperating cylinders (not shown) in a manner later to be described in relation to FIGS. 2 and 6. In the position shown in FIG. 9, the side wall 34 is moved in a upstream direction (towards the mixer/extruder 10)as is also the lower wall 36. On the other hand, the top wall 32 and the opposite side wall 38 are moved relatively farther away (downstream) from the mixer/extruder 10 as compared to their opposite wall members.

Figure 10:
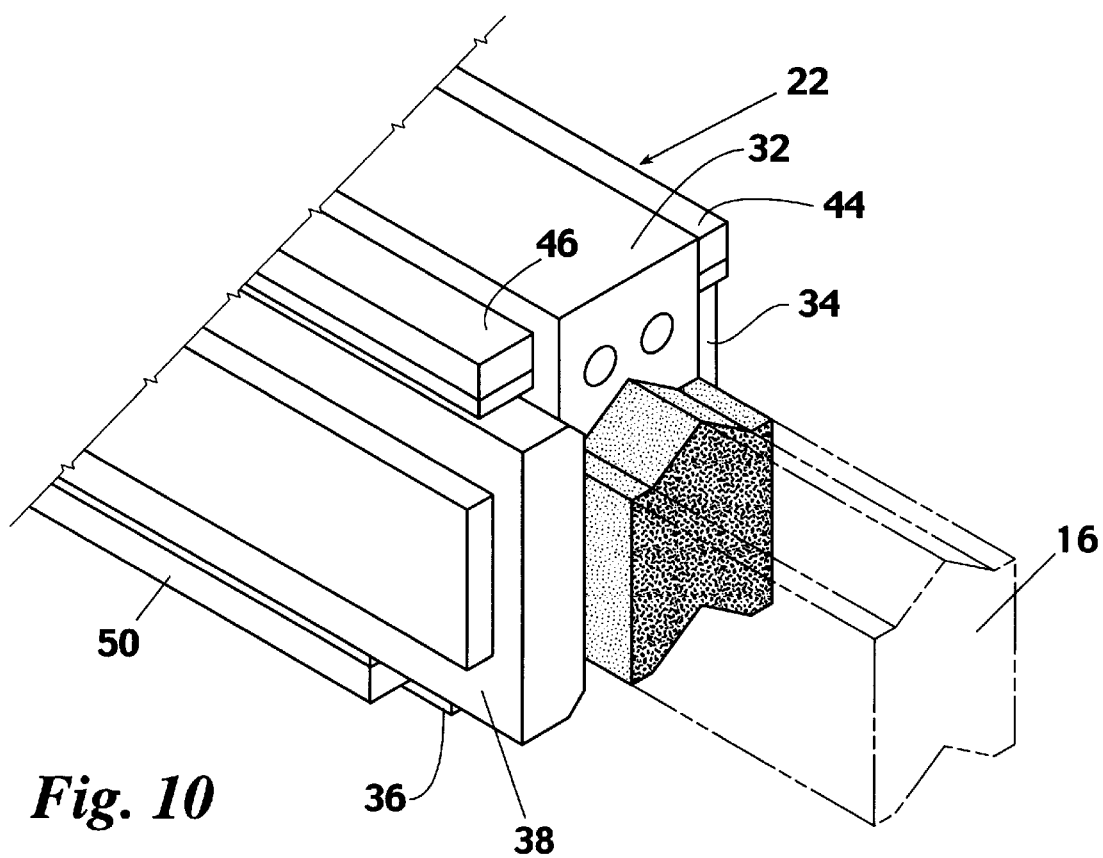
FIG. 10 is a view similar to FIG. 7 but showing the top and front wall members moved relatively closer to the mixer/extruder than the rear and bottom wall members.

In the position shown in FIG. 10, the upper wall 32 is moved relatively downstream with respect to the lower wall 36 (which is not visible in this Figure) while the side wall 38 is moved relatively downstream with respect to the opposite side wall 34.

Figure 4:
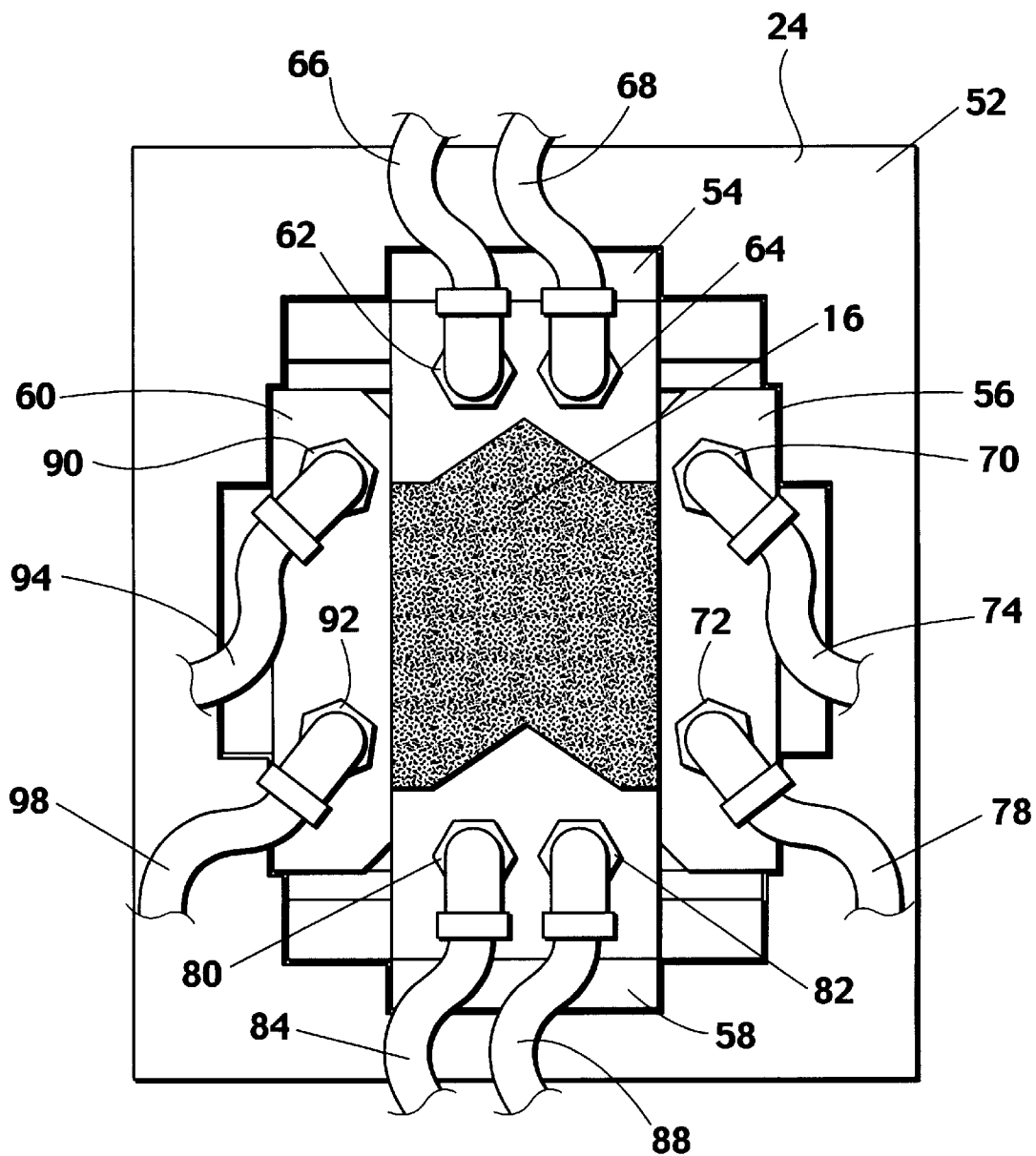
FIG. 4 is an end view looking alone line 4—4 of FIG. 1.

Turning now to FIG. 4, this represents a view taken at the right-hand end of the downstream (shorter) matrix 24 shown in FIG. 1. This matrix 24 is very similar to the matrix 22 but differs in two respects. First of all, it is only two feet in horizontal length whereas the matrix 22 is four feet in length. Secondly, the moveable walls, later to be described, are provided with coolant in a manner later to be described. The matrix 24 is provided with a housing 52 in which the four slidable walls of the matrix 24 are slidably received; That is the matrix 24 includes an upper slidable wall 54, a lower opposite slidable wall 58, a right-hand or rear (with respect to FIG. 2) wall 56, and an opposite (front) wall 60. These walls are similar to the walls 32 thru 38 previously described in relation to FIGS. 1, 3, and 7 thru 10. These walls 54 thru 60 are movable in exactly the same fashion as walls 32 thru 38, as specifically shown in FIGS. 7 through 10, by virtue of a piston and cylinder combination, later to be described in connection with FIGS. 2 and 6.

Furthermore, the pistons (not shown here) which move the moveable walls in FIG. 3 are keyed in such a way that the corresponding walls move in like fashion such that the movements shown in FIGS. 7 thru 10 in relation to FIG. 3 would be duplicated by corresponding movement of the walls in FIG. 4. Thus, when upper wall 32 of the matrix 22 moves in an upstream direction, so also would the upper wall 54 of the matrix 24. Likewise, when the rear side wall 34 moves in an upstream direction, so also would the rear side wall 56 of matrix 24. Completing the comparison, side wall 38 would move in the same direction and the same amount as side wall 60 and lower wall 36 would move the same amount and direction as the side wall 58.

Turning again to FIG. 4, each of the movable walls 54 thru 60 is provided with an internal passage way through which cooling water may flow, so as to cool the beam 16 as it passed through the matrix 24. To this end, the upper movable wall 54 is provided with a pair of horizontal ports 62 and 64 which extend for the full horizontal length of the upper wall 54 and which connect at their opposite ends (in a manner not shown) so as to provide a through passage way through the movable wall 54. A pair of hoses 66 and 68 connect with the horizontal ports 62 and 64 through suitable fittings, such that water can flow through the combined passageway 62/64. Thus, if hose 66 was connected to a supply of cold water (or other suitable coolant) and hose 68 was connected to a discharge location, then water would flow through the hose 66, into the horizontal port 62, out the horizontal port 64 and out through the hose 68.

In like manner, the rear side wall 56 is provided with horizontal ports 70 and 72 which connect with hoses 74 and 78. Thus, cold water can pass into the hose 74, for example, through the horizontal port 70, back through the horizontal port 72, and out the discharge hose 78.

The lower slidable wall 58 is provided with ports 80 and 82 which connect with hoses 84 and 88 so as to provide a passage for coolant similar to the description in relation to the movable walls 54 and 56.

Finally, movable wall 60 is provided with horizontal ports 90 and 92 which connect with hoses 94 and 98 to provided a flow passage for coolant through the movable wall 60.

Figure 5:
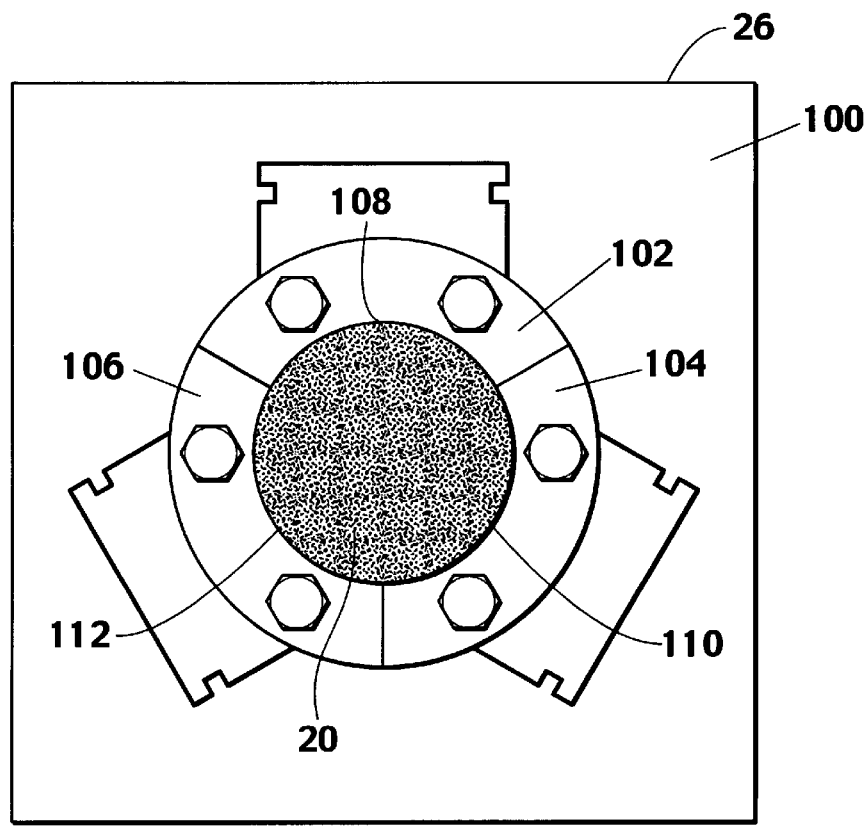
FIG. 5 is an end view looking alone line 5—5 of FIG. 2.

Referring now to FIG. 5, this figure shows some of the details of the upstream matrix 26 (the one which is closer to the mixer/extruder 10). This matrix comprises a housing 100 in which is slidably mounted an upper arcuate slidable member 102, a right-hand (as it appears in FIG. 5) arcuate slidable member 104, and a left-hand arcuate slidable member 106. The slidable member 102 has an inner arcuate surface 108 which corresponds with the outer shape of the circular beam 20 as it proceeds from the extruder tube 18. Similarly, the slidable member 108 has an inner arcuate surface 110, and the slidable member 106 has an inner arcuate surface 112. When the slidable members are juxtaposed as shown in FIG. 5, together they form a circular passageway in which the beam 20 is received and guided as it passes through the matrix 26. Each one of the slidable members 102, 104 or 106 is individually movable or slidable in a horizontal direction by means of a plurality of pistons and cooperating cylinders as referred to above, (not shown herein) but which will be described below in relation to the description of FIGS. 2 and 6.

Figure 6:
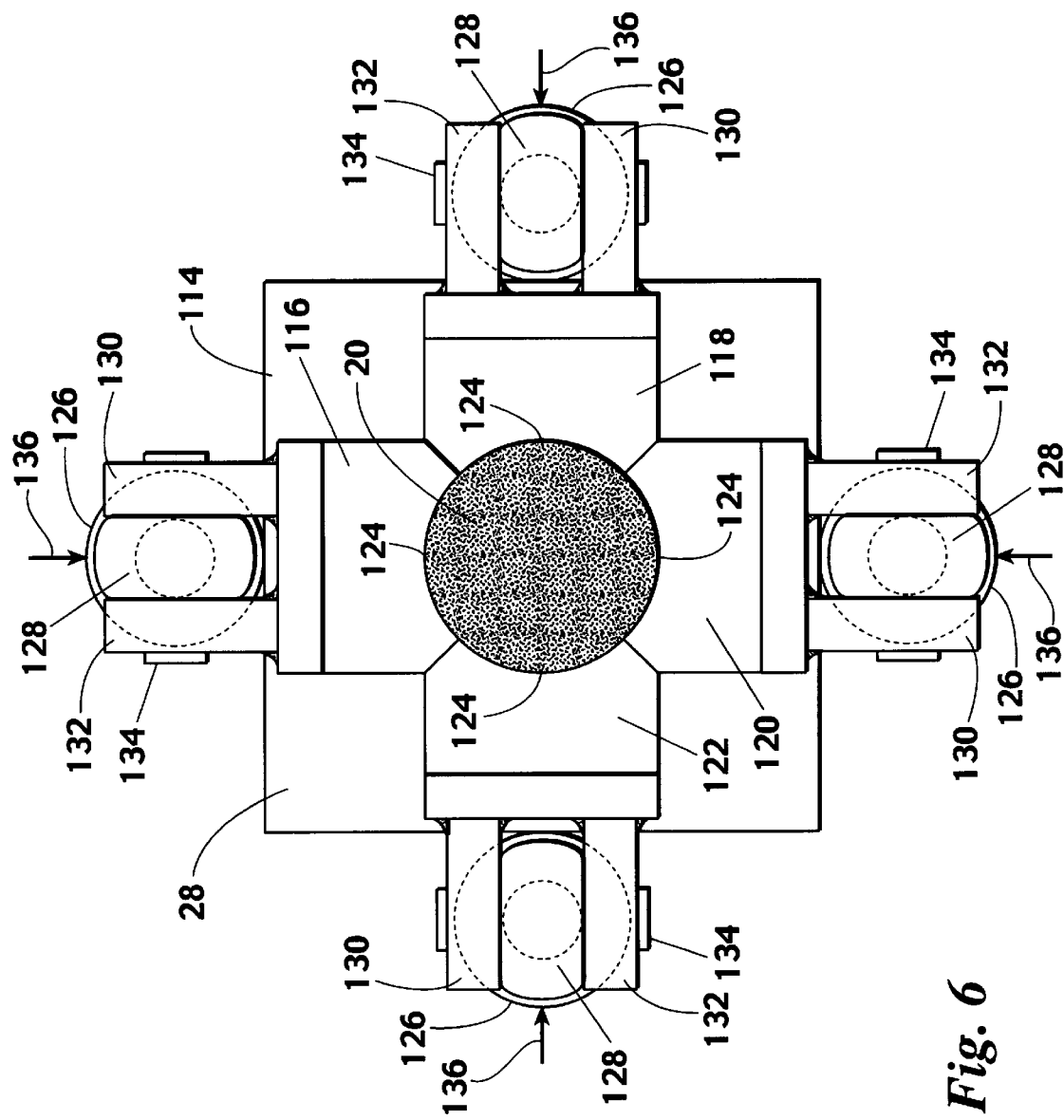
FIG. 6 is an end view looking along line 6—6 of FIG. 2.

Referring now to FIGS. 2, and 6, these figures relate to the downstream matrix 28 which is used to shape and guide the cylindrical beam 20 therethrough. The matrix 28 is provided with a frame 114 in which four slidable member are slidably received. These four members comprise an upper slidable member 116, a right-hand slidable side member 118, a lower slidable member 120 and a left-hand slidable member 122. The upper slidable member 116 has an inner cylindrical surface 124 which comprises an arc of about 90 degrees. Each of the other slidable members 118, 120, and 122 also has an arcuate inner surface 124 each one of which constitutes one quarter of the total cylindrical surface in which the beam 20 is received and through which the beam 20 passes. As was the case with the matrix 22, each one of the slidable members 116, 118, 120 or 122 of the matrix 28 is individually slidable and is capable of achieving the relative positions shown in FIGS. 7 thru 10, inclusive.

Each slide member shown in FIGS. 2 and 6 has a piston and cylinder associated therewith for the purpose of providing the sliding movement referred to herein. For example, slide member 116 is provided with a cylinder 126 in which is slidably received a piston 128. The end of each piston rod 128 is enlarged, as at 130, and is received between a pair of ears 132 mounted at the top of the upper slidable member 124. A pin 134 passes through the ears 132 and the end 130 of the piston rod 128 so that the piston rod is in engagement with the upper slide member 116.

A hose 136 connects with one end of the cylinder 126. A second hose 138 connects with the opposite end of the cylinder 126. If hydraulic pressure is applied to the hose 136, the piston 128 and, hence, the slide 116 will move in a downstream direction. If, on the other hand, pressure is applied through the hose 138, the piston 128 and the slide 116 will move in an upstream direction. Each of the other slide members 118, 120, and 122 is similarly provided with cylinders 126 and pistons 128 which operate to reciprocate these members in the same way that slidable member 116 is moved back and forth in a horizontal path by its piston and cylinder combination 126/128. Each cylinder 126 is associated with a piston 128 which is connected to ears 130 and 132 on each slidable member (118, 120, or 122) by means of a pin 134. Each cylinder 126 is also provided with a hose 136 which connects with one end of the cylinder 126 and a hose 138 which connects with the opposite end of the cylinder. Each cylinder 126 is operated independently of the others so that, ultimately, the type of motion of the individual slide members 116, 118, 120, and 122 will be similar to that shown in FIGS. 7 through 10, inclusive.

It should be understood that the slidable members 102, 104, and 106 shown in FIG. 5 are provided with pistons and cylinders (not shown) which will provide sliding movement of these members in a manner similar to that described in relation to FIGS. 2 and 6. Furthermore, upper slidable member 102 in FIG. 5 will be synchronized with the movement of the upper slidable member 116 in the matrix 28. The right slidable member 104 will be synchronized with the movement of the right-hand slidable member 118 and the left slidable member 106 shown in FIG. 5 will be synchronized with the movement of the left-hand slidable member 122 shown in FIG. 6. There will be no member in the matrix 26 which will be coordinated with the movement of the lower slidable member 120 in FIG. 6.

For the sake of simplicity, the drawings do not show that the matrices 22 and 24 are provided with pistons and cylinders, such as the piston/cylinder combination 126/128, associated therewith. However, it should be understood that similar cylinders and pistons, 126 and 128, will be actually associated with the slidable members in these matrices; for the sake of simplicity, however, they are not illustrated nor will the descriptions thereof be repeated.

Whereas the present invention has been described with particular relation to the drawings attached hereto, it should be understood that other and further modifications of the present invention, apart from those shown or suggested herein, may be made in the spirit and scope of this invention. It should be further understood that sizes and dimensions, where given, are merely illustrative and are not intended to be limiting on the invention. The Andersson patent and the Evancic patent, discussed above, describe in general terms the proportions of ingredients that can be used in the mixer/extruder for producing the beam desired. It should be understood that the choice of the actual proportions can be made by the man skilled in this art depending, principally upon the properties of the ultimate product desired.

What is claimed is:

1. In combination with a mixer/extruder designed to mix, heat and extrude a mixture of shredded plastic material and shredded fibrous material, the heated mixture being extruded in the form of a continuous beam from an extrusion nozzle, the improvement which comprises a first matrix spaced horizontally downstream from the nozzle for receiving the beam therein and a second matrix spaced horizontally downstream from the fist matrix for receiving the beam therein, the first matrix having moveable walls which reciprocate in a horizontal direction against the outer surface of the beam, the second matrix having moveable walls which reciprocate in a horizontal direction against the outer surface of the beam, the moveable walls of both matrices having inner surfaces which together form a shape corresponding to the outer surface of the beam, the walls of both matrices completely surrounding the beam as it passes through each matrix, the second matrix having means for conducting cooling water therethrough for cooling the beam as it passes through the second matrix, wherein the moveable walls of the first matrix move in concert with the moveable walls of the second matrix.

2. The combination as set forth in claim 1 wherein the first matrix has a plurality of cylinders mounted thereon associated with each of the moveable walls of the first matrix and a plurality of pistons associated with the plurality of cylinders, hydraulic means for actuating the pistons of the first matrix so as to reciprocate the moveable walls of the first matrix, the second matrix having a plurality of cylinders mounted thereon associated with each of the moveable walls of the second matrix, a plurality of pistons associated with the plurality of cylinders of the second matrix, hydraulic means for actuating the pistons of the second matrix for reciprocating the moveable walls of the second matrix, the hydraulic means for the first and second matrices being such that the moveable walls of the first matrix move in concert with the moveable walls of the second matrix.

3. The combination as set forth in claim 1 wherein the continuous beam is extruded from the mixer/extruder in form of a cylinder, the moveable walls in the first matrix having inner surfaces which together form a cylindrical shape for contacting the outer surface of the beam, the moveable walls in the second matrix have inner surfaces which together form a cylindrical shape for contacting the outer surface of the beam.

4. The combination as set forth in claim 1 wherein the continuous beam extruded from the mixer/extruder is generally rectangular in cross sectional shape but having vertical side surfaces and an upper surface having a V-shaped ridge and a lower surface having a V-shaped notch, each matrix having a moveable upper wall having an internal V-shaped notch therein which contacts the V-shaped ridge of the beam, each matrix having a moveable lower wall having an inner surface in the form of a V-shaped ridge for contacting the V-shaped notch on the bottom of the beam, each matrix having a pair of vertical moveable walls whose inner flat surfaces contact the vertical side surfaces of the beam.

5. The combination as set forth in claim 4 wherein the first matrix has a plurality of cylinders mounted thereon associated with each of the moveable walls of the first matrix and a plurality of pistons associated with the plurality of cylinders, hydraulic means for actuating the pistons of the first matrix so as to reciprocate the moveable walls of the first matrix, the second matrix having a plurality of cylinders mounted thereon associated with each of the moveable walls of the second matrix, a plurality of pistons associated with the plurality of cylinders of the second matrix, hydraulic means for actuating the pistons of the second matrix for reciprocating the moveable walls of the second matrix, the hydraulic means for the first and second matrices being such that the moveable walls of the first matrix move in concert with the moveable walls of the second matrix.

6. In the method of producing an elongated beam from a compressible and compressed material mixture wherein a mixture of a plastic material and a filling material are introduced into a mixer/extruder, said plastic material and filling material being heated and compressed in the mixer/extruder and being extruded therefrom in the form of a continuous beam of material having a predetermined cross sectional shape, the improvement which comprises passing the beam of material from the mixer/extruder through a first matrix for subsequent treatment therein and wherein a plurality of wall parts of said first matrix are moved in a horizontally reciprocal manner along the outer surfaces of the beam as the beam passes through the first matrix, passing the beam of material from the first matrix through a second matrix for subsequent treatment therein and wherein a plurality of wall parts of said second matrix are moved in a horizontally-reciprocal manner along the outer surfaces of the beam as the beam passes through the second matrix, and moving the wall parts of the first matrix in concert with the wall parts of the second matrix.

\* \* \* \* \*